March 22, 1966  J. R. WILLSON  3,241,762
FUEL CONTROL VALVE STRUCTURE
Filed Jan. 26, 1962  11 Sheets-Sheet 1
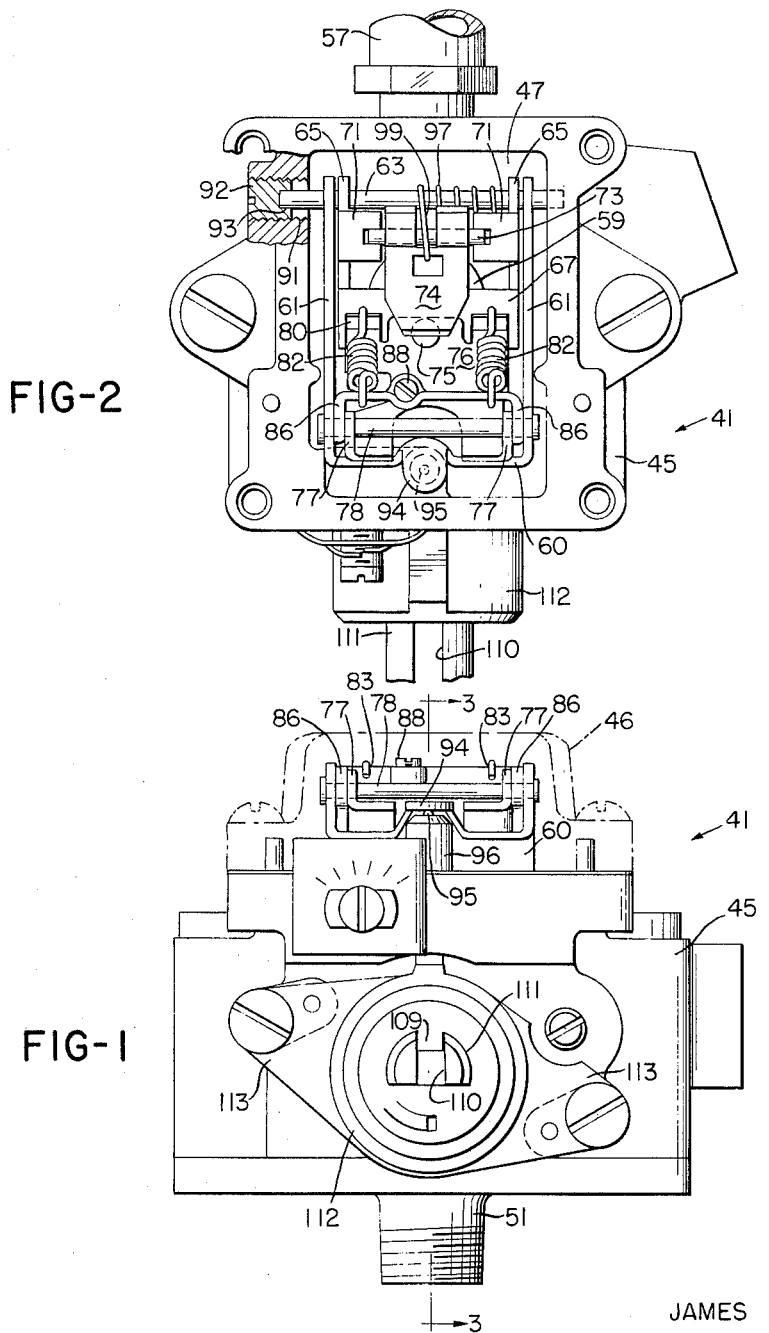
INVENTOR.
JAMES R. WILLSON
BY
Robert R. Candor
ATTORNEY

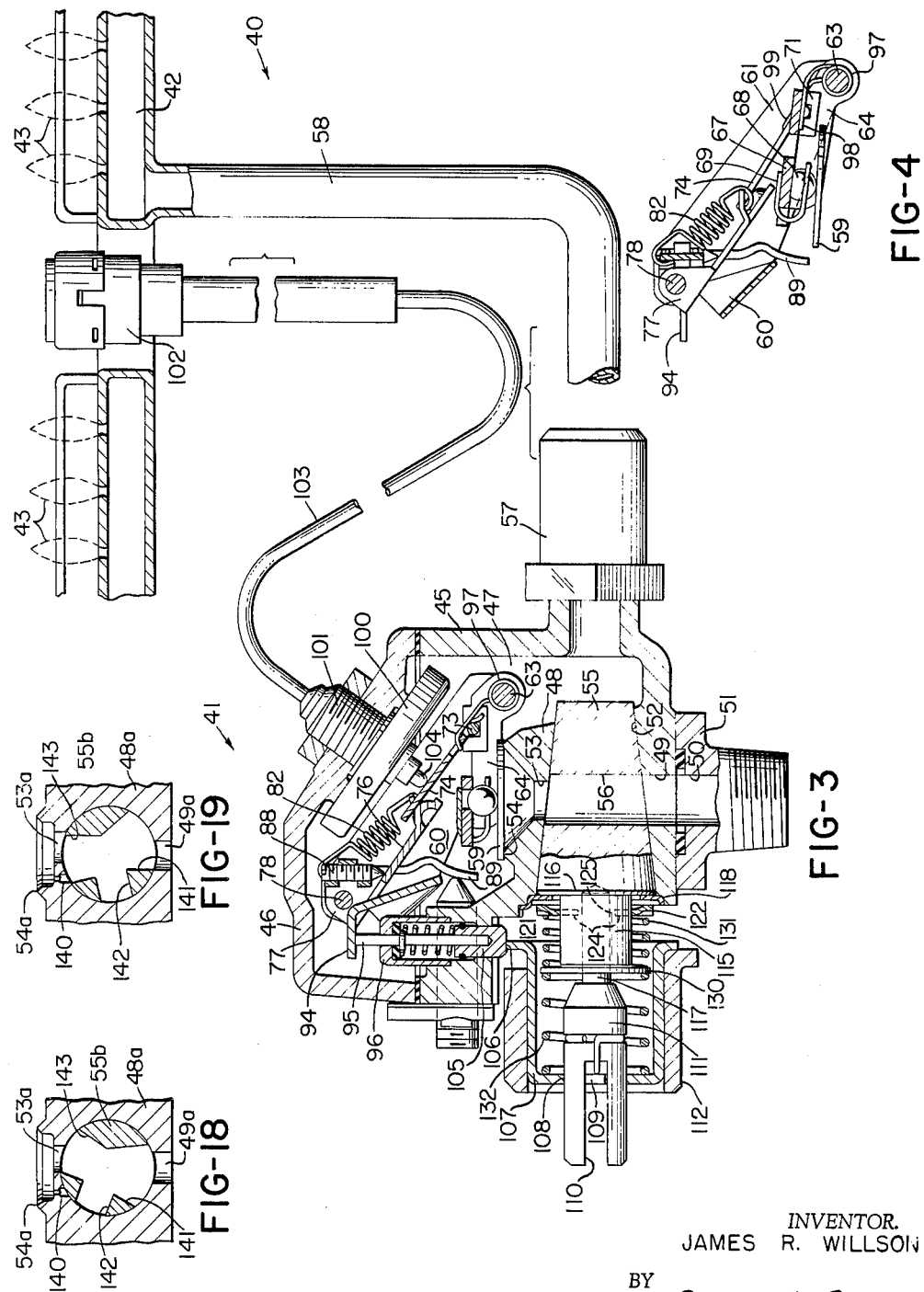

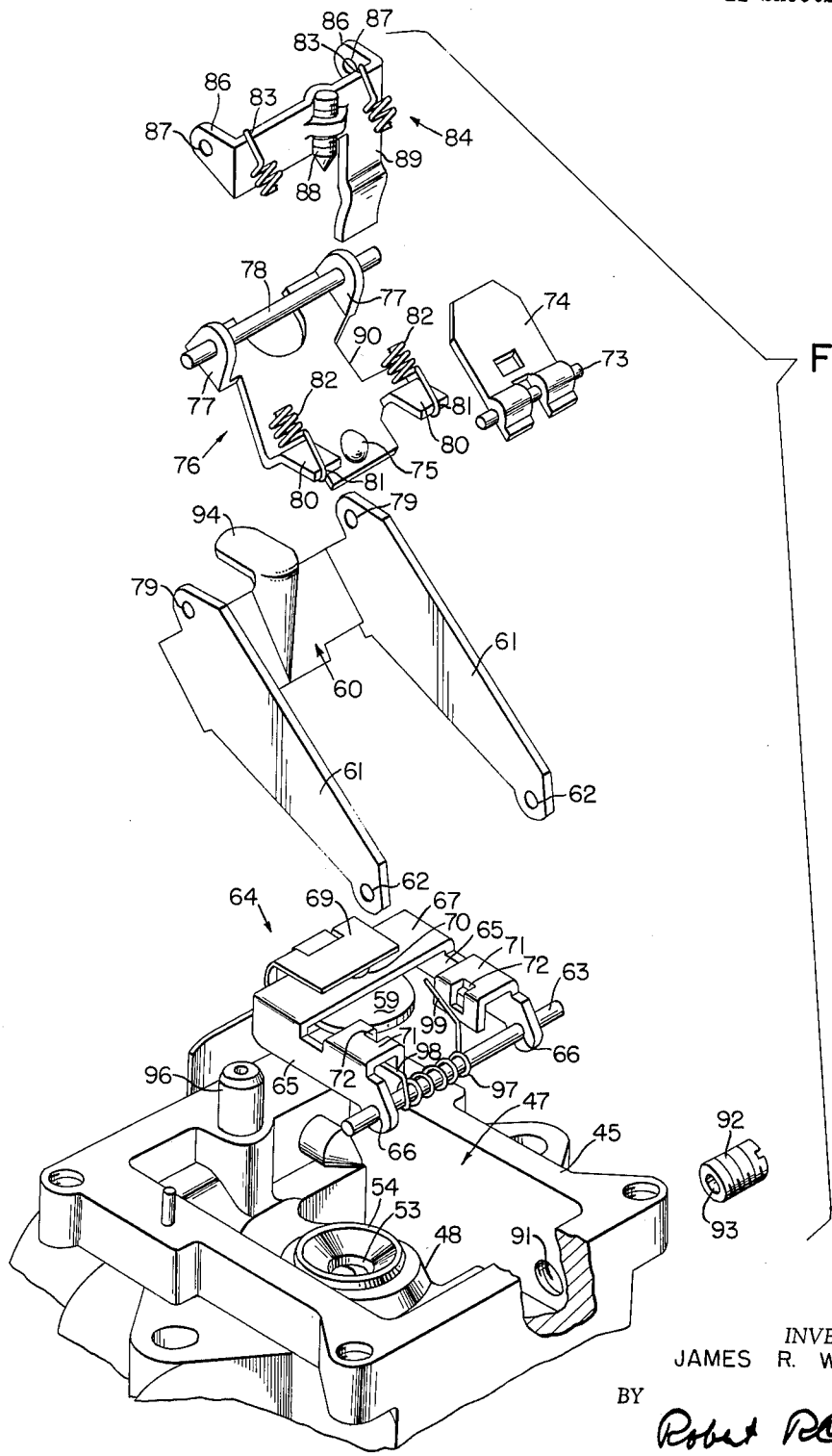

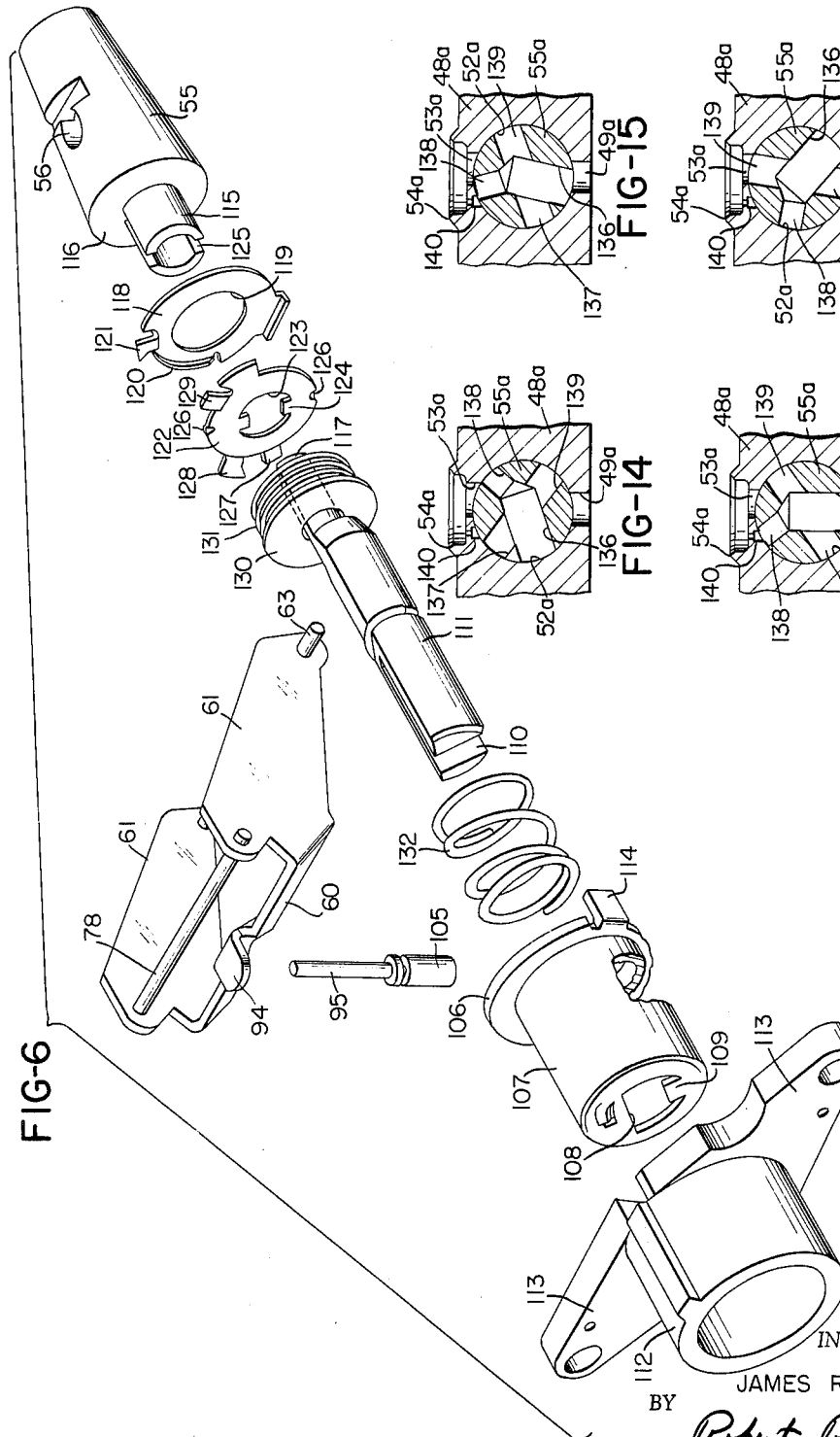

March 22, 1966 J. R. WILLSON 3,241,762
FUEL CONTROL VALVE STRUCTURE
Filed Jan. 26, 1962 11 Sheets-Sheet 5
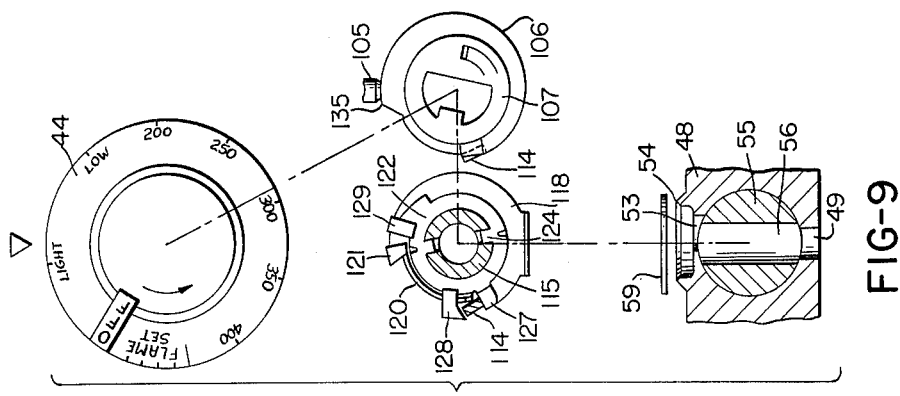
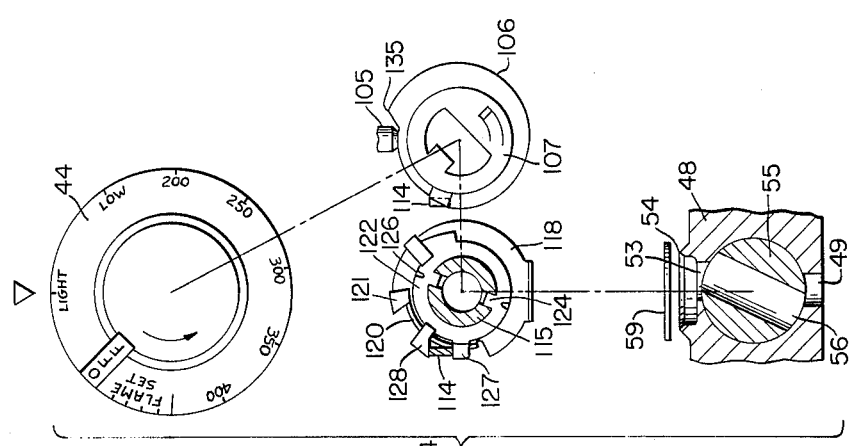
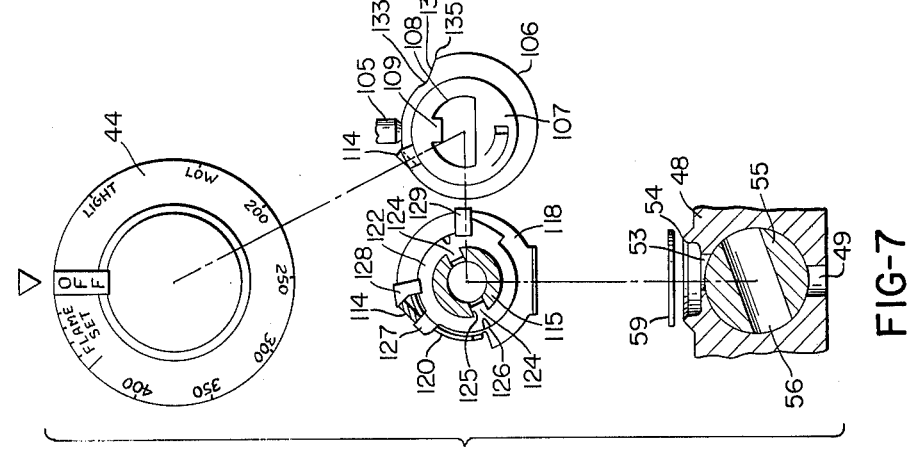
INVENTOR.
JAMES R. WILLSON
BY
Robert Beaner
ATTORNEY INVENTOR.
JAMES R. WILLSON
BY
Robert R Candor
ATTORNEY March 22, 1966 J. R. WILLSON 3,241,762
FUEL CONTROL VALVE STRUCTURE
Filed Jan. 26, 1962 11 Sheets-Sheet 7
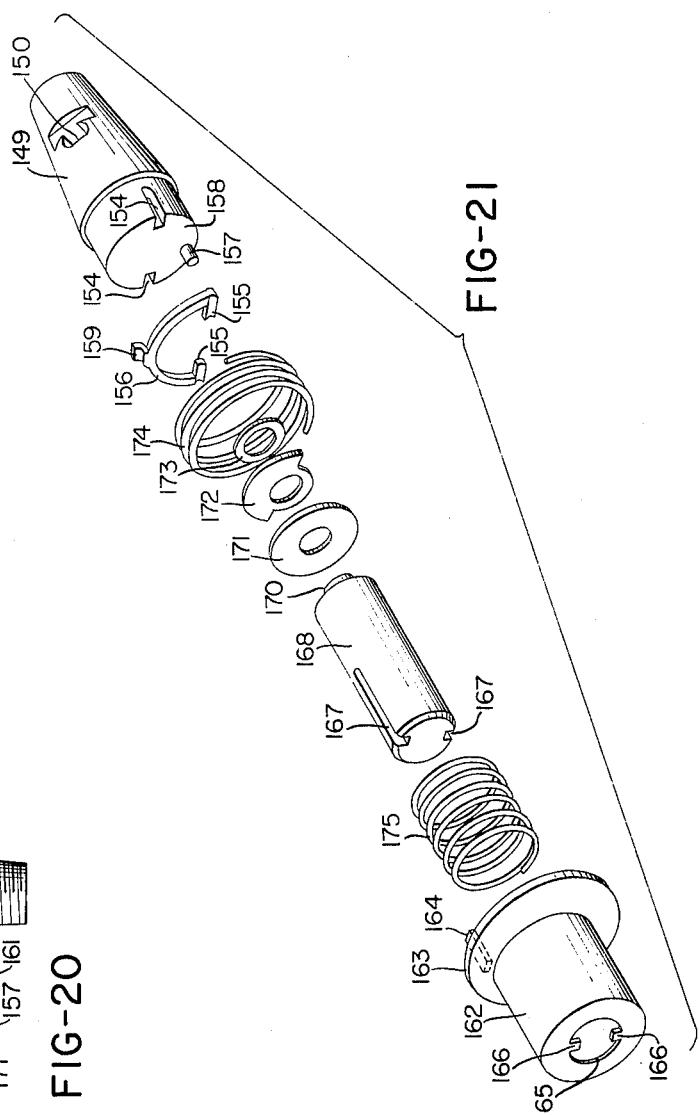
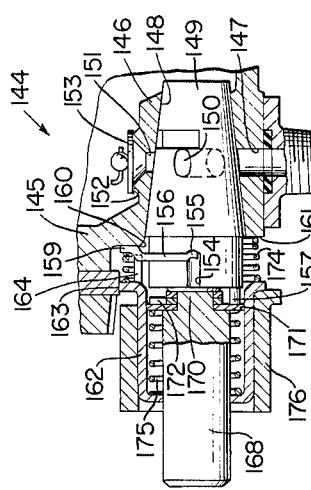
INVENTOR.
JAMES R. WILLSON
BY
Robert B Bender
ATTORNEY

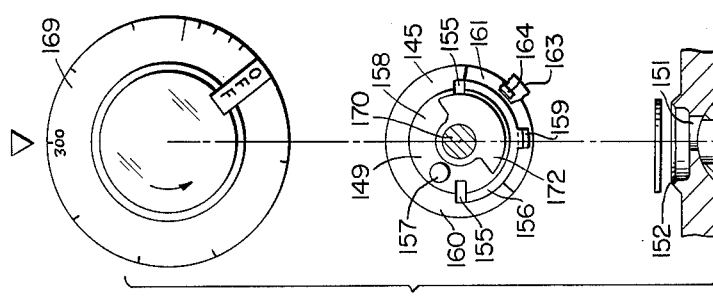
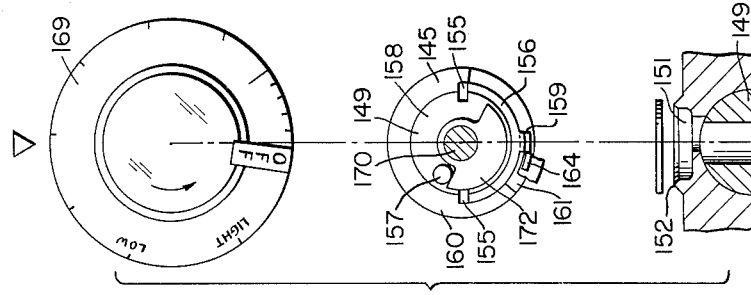
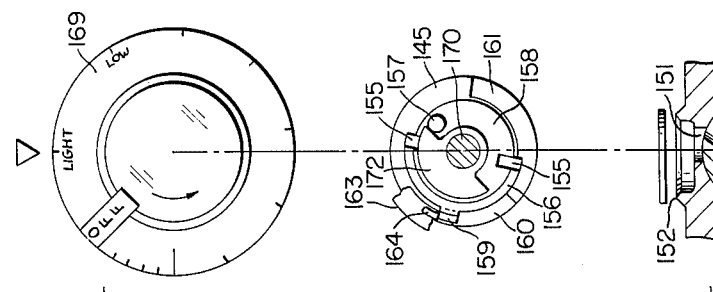
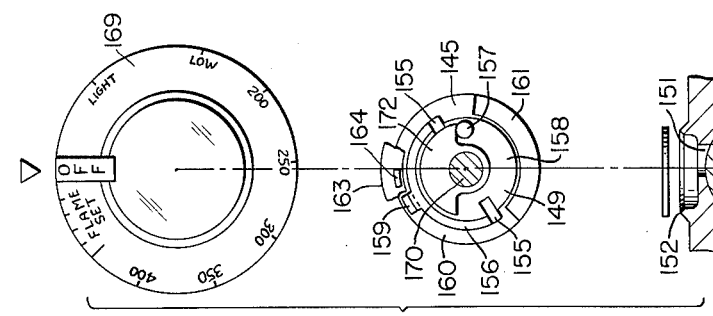

March 22, 1966  J. R. WILLSON  3,241,762
FUEL CONTROL VALVE STRUCTURE
Filed Jan. 26, 1962  11 Sheets-Sheet 9

INVENTOR.
JAMES R. WILLSON
BY
Robert R Cauden
ATTORNEY

March 22, 1966 J. R. WILLSON 3,241,762
FUEL CONTROL VALVE STRUCTURE
Filed Jan. 26, 1962 11 Sheets-Sheet 10
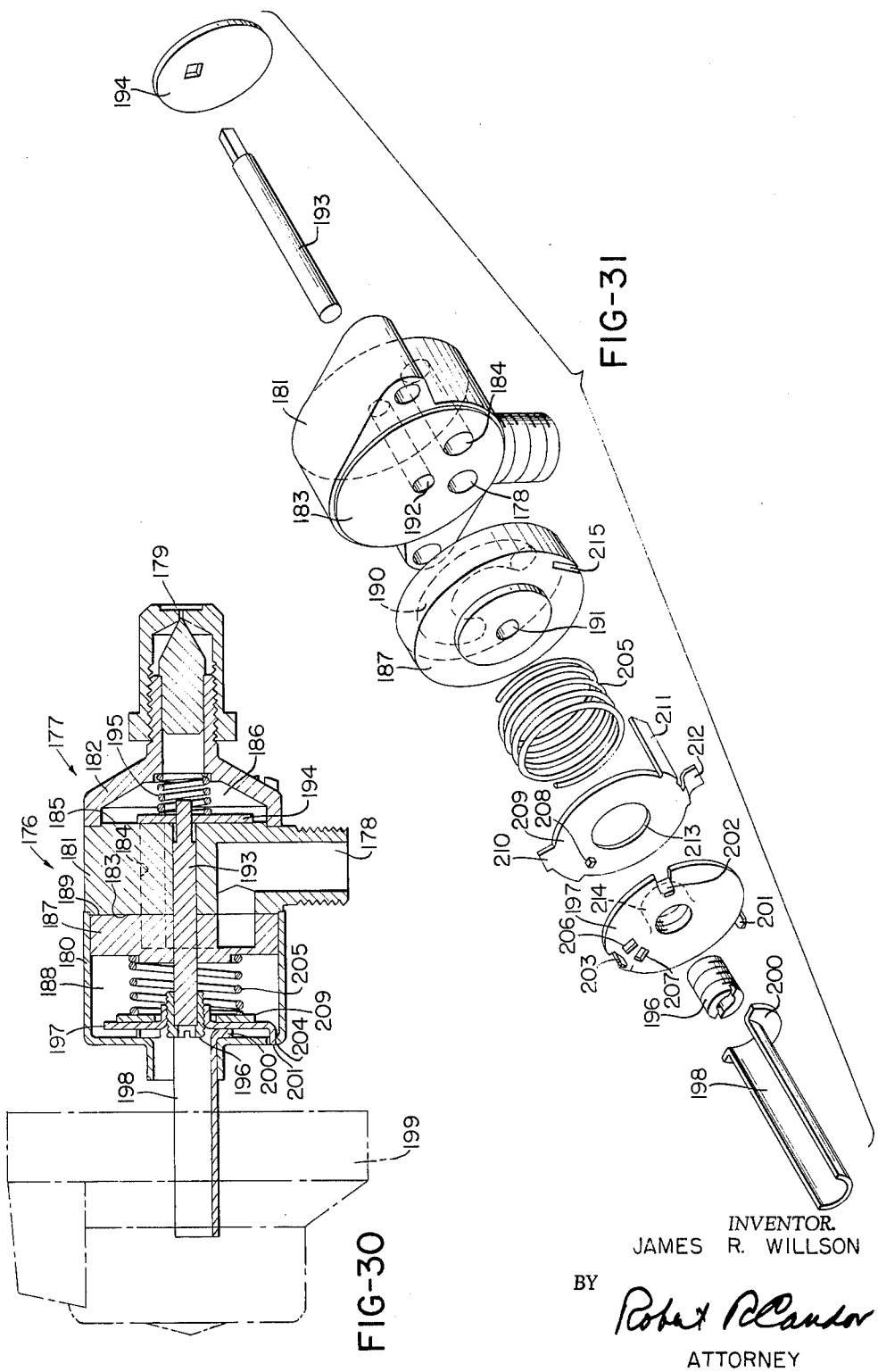
INVENTOR.
JAMES R. WILLSON
BY
Robert R Cantor
ATTORNEY

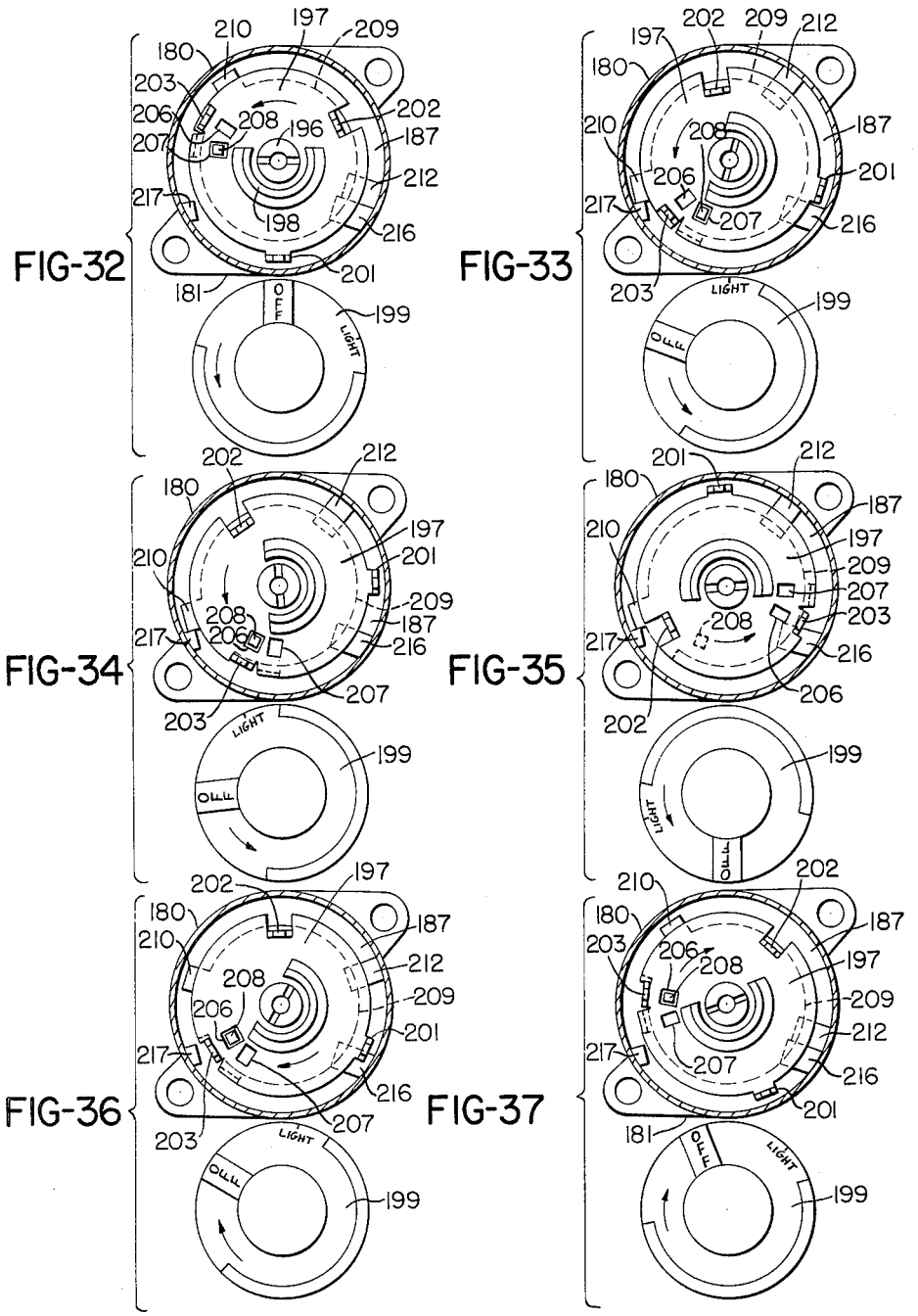

United States Patent Office 3,241,762
Patented Mar. 22, 1966

3,241,762
FUEL CONTROL VALVE STRUCTURE
James Robert Willson, Greensburg, Pa., assignor to Robertshaw Controls Company, Richmond, Va., a corporation of Delaware
Filed Jan. 26, 1962, Ser. No. 169,002
21 Claims. (Cl. 236—99)

This invention relates to improved fuel control systems and to improved parts for such systems or the like.

In conventional fuel control systems for range top gas burners and the like, the source of fuel is interconnected to the gas burner by a selectively operated valve structure. Usually, such valve structure comprises a first valve member that controls the flow of fuel to the gas burner and a second valve member that controls the flow of fuel to the gas burner at a point downstream from the first valve member. For example, the second valve member may be controlled to maintain the temperature of a pan or the like sitting on the gas burner at a selected temperature or the second valve member can selectively control the height of the flame at the gas burner.

In either event, it is desirable to have a single control device which when moved from its off position will open the first valve member and, thereafter, be disconnected from the first valve member during further movement of the control device to control the second valve member independently of the first valve member.

For example, when the second valve member is utilized to maintain the temperature of a pan sitting on the gas burner at a selected temperature, initial movement of the control device from the off position thereof fully opens the first valve member to permit fuel to issue from the gas burner and be ignited by a suitable pilot burner arrangement. Further movement of the control device then selects the desired temperature for the cooking article sitting on the gas burner whereby the second valve member cycles between the opened and closed positions thereof to regulate the supply of fuel to the gas burner to maintain the cooking article at the selected temperature.

However, it has been found that in the above fuel control system where the cooking article is maintained at a selected temperature, it is sometimes desirable to cook at the selected temperature with a high flame at the gas burner to provide rapid cooking or at other times with a relatively low flame to provide gentle cooking.

Therefore, some means must be provided for selectively regulating the first valve member between its fully opened and fully closed positions to provide the desired flame adjustment of the gas burner because the opening and closing of the second valve member is dependent solely on the selected temperature of the cooking article.

Preferably, such flame height setting should be controlled by the control device of the fuel control system whereby a single control device can provide all of the desired settings for the gas burner.

Accordingly, it is an object of this invention to provide improved fuel control systems of the above type.

Another object of this invention is to provide improved valve structures for such fuel control systems or the like.

A further object of this invention is to provide improved clutch structure for such valve structures or the like.

Other objects, uses and advantages of this invention are apparent from a reading of this description which proceeds with reference to the accompanying drawings forming a part thereof and wherein:

FIGURE 1 is a front elevation view of the valve construction of this invention with the cover in dash lines and the control knob removed.

FIGURE 2 is a top plan view of the valve construction illustrated in FIGURE 1 with the cover thereof removed.

FIGURE 3 is a cross-sectional view of the valve construction illustrated in FIGURE 1 and is taken on line 3—3 thereof, FIGURE 3 illustrating the fuel control system of this invention.

FIGURE 4 is an elevation view of part of the structure of the valve construction illustrated in FIGURE 3.

FIGURE 5 is an exploded perspective view of portions of one of the valve structures of the valve construction of FIGURE 3.

FIGURE 6 is an exploded perspective view illustrating the other valve member operating means of this invention.

FIGURES 7–13 are schematic views illustrating the movement of valve members of the valve construction of FIGURE 3 at different dial settings thereof.

FIGURES 14–17 are cross-sectional views illustrating the various positions of another valve cock of this invention.

FIGURES 18 and 19 are respectively cross-sectional views illustrating another valve cock of this invention.

FIGURE 20 is a fragmentary cross-sectional view similar to FIGURE 3 and illustrates another valve construction of this invention.

FIGURE 21 is an exploded perspective view illustrating certain parts of the valve construction of FIGURE 20.

FIGURES 22–29 are schematic views illustrating the movement of the valve members of the valve construction of FIGURE 20 at various dial settings thereof.

FIGURE 30 is a cross-sectional view illustrating still another valve construction of this invention.

FIGURE 31 is an exploded perspective view of certain of the parts of the valve construction of FIGURE 30.

FIGURES 32–37 are respectively schematic views illustrating the movement of the operating parts of the valve construction of FIGURE 30 at various dial settings thereof.

Figure 13:
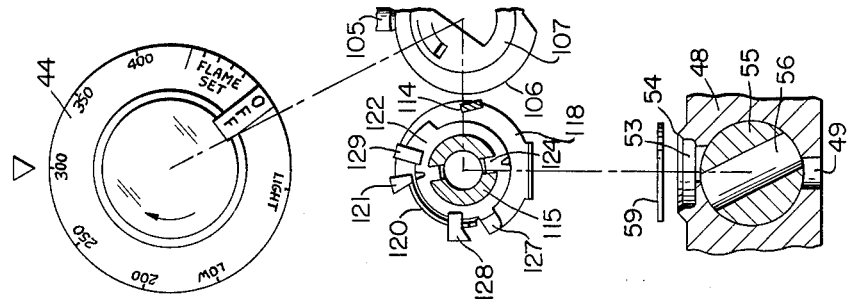

While the various features of this invention are hereinafter described and illustrated as being incorporated in particular fuel control sytsems, it is to be understood that the various features of this invention can be utilized singly or in any combination thereof in any desired systems or the like.

For example, the various clutch mechanisms of this invention can be utilized to selectively interconnect movable members other than the valve members disclosed herein.

Therefore, this invention is not to be limited to only the embodiments illustrated in the drawings because the drawings are merely utilized to illustrate some of the wide variety of uses of this invention.

Referring now to FIGURE 3, one improved fuel control system of this invention is generally indicated by the reference numeral 40 and comprises a valve construction 41 adapted to interconnect a source of fuel (not shown) to a top gas burner 42 of a domestic gas range or the like in such a manner that not only may the temperature of the cooking utensil sitting on the burner 42 be maintained at any desired temperature, but also the flames 43 of the burner 42 can be adjusted to any desired height to provide rapid or gentle cooking while the temperature of the cooking utensil is being maintained at the selected temperature, the above features of the burner 42 being controlled by a single control knob 44, FIGURE 7, in a manner hereinafter described.

As illustrated in FIGURE 3, the valve construction 41 comprises a housing 45 cooperating with a cover member 46 to define a chamber 47 therebetween, the housing 45 having an inwardly directed boss 48 provided with a passage 49 leading to a passage 50 formed in a coupling member 51, the coupling member 51 being adapted to be interconnected to a source of fuel, such as a conventional manifold of the gas range or the like.

A transverse tapering bore 52 is formed in the boss 48 and intersects the passage 49 thereof as well as another passage 53 formed in the boss 48 and leading to an annular valve seat 54.

A rotatable cock valve member 55 is disposed in the tapering bore 52 of the housing 45 and has a passage 56 passing transversely therethrough, the passage 56 disposed out of communication with the passages 49 and 53 when the valve member 55 is disposed in the "off" position thereof and interconnecting the passages 49 and 53 to the desired degree in a manner hereinafter described to permit fuel to flow from the source thereof through the valve seat 54 into the chamber 47 and out of the chamber 47 through an outlet coupling 57 interconnected to a conduit 58 leading to the burner 42.

A movable valve member 59 is carried by the housing 45 and is disposed in the chamber 47 to open and close the valve seat 54 at a point downstream from the valve member 55, the valve member 59 maintaining the temperature of the cooking utensil sitting on the burner 42 at a selected temperature in a manner hereinafter described.

The particular details for controlling the movement of the valve member 59 will now be described and reference is made to FIGURE 5.

A substantially U-shaped frame 60 has the opposed legs 61 thereof provided with suitable apertures 62 at the free ends thereof to respectively receive a pivot pin 63, the pivot pin 63 also carrying a valve lever 64.

The valve lever 64 has a pair of opposed legs 65 provided with apertures 66 at the free ends thereof which respectively receive the pivot pin 63, the legs 65 being integrally interconnected together by an intermediate plate 67.

The circular valve member 59, having a ball bearing 68, FIGURE 4, welded to its center, is assembled to the plate 67 of the valve lever 64 by a U-shaped spring clip 69, one leg of the U-shaped spring clip 69 resting on the top of the plate 67 and the bottom leg thereof being bifurcated to accommodate the ball bearing 68 and hold it against an aperture 70 formed in the plate 67 to provide a self-leveling valve member 59.

Channel-shaped members 71 are respectively formed on the legs 65 of the valve lever 64 between the plate 67 and the pivot pin 63, the channel-shaped members 71 having relieved portions 72 to form bearing means which mount a pivot pin 73.

The pivot pin 73 is attached to a bifurcated end of a bi-metal lever 74 whereby the free end of the bi-metal lever 74 bears against a projection 75 on one end of an overshoot lever 76.

The other end of the overshoot lever 76 is provided with upwardly extending ears 77 which respectively receive a pivot pin 78, the pivot pin 78 also being mounted in apertures 79 formed in the legs 61 of the frame member 60.

A pair of formed tabs 80 are provided at one end of the overshoot lever 76 and have notches 81 for anchoring a pair of overshoot springs 82, the other ends of the overshoot springs 82 being hooked in notches 83 formed in a calibrating lever 84.

The calibrating lever 84 is provided with outwardly extending ears 86 which respectively have apertures 87 formed therein to receive the pivot pin 78 of the overshoot lever 76.

Therefore, the overshoot springs 82 bias the overshoot lever 76 in a counterclockwise direction about the pivot pin 78. Such counterclockwise rotation of the overshoot lever 76 is prevented by an adjusting screw 88 threaded into the calibrated lever 84 whereby the overshoot springs 82 keep the levers 76 and 84 biased in a loaded condition against the adjusting screw 88. The adjustment position of the screw 88 determines the angular relationship between the two levers 76 and 84.

A leg 89 is formed on the right hand side of the calibrating lever 84 as viewed in FIGURE 5 and extends downwardly through a relieved portion 90 formed in the overshoot lever 76.

The interconnected frame 60, valve lever 64, bi-metal lever 74, overshoot lever 76 and calibrating lever 84 are inserted as a sub-assembly in the valve cavity 47 with the pivot pin 63 having one end thereof disposed in a suitable bore (not shown) formed in the housing 45 and the other end thereof disposed in a threaded bore 91, FIGURE 5, and retained therein by a retaining screw 92 having a bore 93 whereby one end of the aforementioned sub-assembly is mounted in the housing 45.

A tang 94 extends outwardly from the medial portion of the U-shaped frame member 60 and rests on a cam pin 95, FIGURE 3, which is disposed in a cam pin guide 96 carried by the housing 45 whereby the free end of the aforementioned sub-assembly is supported by the cam pin 95.

A torsion spring 97 encompasses the pivot pin 63 and has one end 98 thereof contained under one of the channel-shaped members 71 of the valve lever 64 and the other end 99 thereof disposed between the bifurcated ends of the bi-metal lever 74 and resting against the bi-metal lever 74 as illustrated in FIGURE 3. In this manner the torsion spring 97 holds the pivot pin 73 of the bi-metal lever 74 in the relieved portions 72 of the channel-shaped members 71 while at the same time biasing the valve lever 64 to an open valve position to act as a valve return spring.

Means are provided for controlling the operation of the valve lever 64 and, thus, the position of the valve member 59 relative to the valve seat 54 in response to the temperature of the cooking utensil sitting on the burner 42.

In particular, an expansible diaphragm assembly 100, FIGURE 3, is disposed in the cavity 47 and has one wall thereof fixed to a threaded retainer 101 passing through the cover 46 and interconnected thereto, the movable wall of the diaphragm assembly 100 having a projection 104 abutting the bi-metal lever 74.

The interior of the diaphragm assembly 100 is interconnected to a sensing element 102 by a conduit 103, the sensing element 102 being disposed at the burner 42 and sensing the temperature of the cooking utensil sitting thereon whereby a suitable medium in the sensing element 102 expands or contracts in relation to the temperature of the cooking utensil to cause subsequent expansion and contraction of the diaphragm assembly 100 in a manner well known in the art.

For example, when the diaphragm assembly 100 expands, the movable wall thereof pushes downwardly on the bi-metal lever 74 whereby the bi-metal lever 74 pivots about the projection 75 of the overshoot lever 76. This movement of the bi-metal lever 74 transmits thrust to the seat lever 64 through the pivot pin 73 of the bi-metal lever 74 thereby pivoting the lever 64 about the pivot pin 63 against the bias of the torsion spring 97 to move the valve member 59 toward engagement with the valve seat 54.

Upon normal overshoot or if the sensing head 102 is suddenly subject to extremely high temperatures, the excess thrust created will be transmitted to the overshoot lever 76 which will pivot about the pin 78 against the bias of the overshoot springs 82 to prevent excessive stressing of the control parts when the valve member 59 has been fully seated against the valve seat 54.

Means are provided for setting the temperature at which the valve member 59 will be moved into engagement with the valve seat 54.

In particular, the cam pin 95 disposed in the cam pin guide 96 is operable to engage the tang 94 of the frame member 60 to rotate the frame member 60, calibrating lever 84, overshoot lever 76 and the bi-metal lever 74 to pivot the sub-assembly in relation to the position of the cam pin 95 relative to the housing 45. This pivotal movement of the frame member 60 varies the position that the bi-metal lever 74 engages the projection 104 of the diaphragm assembly 100. With the changed position of the bi-metal lever 74 relative to the projection 104 on the expansible diaphragm assembly 100, it is apparent that a different sensed temperature will be required to cause the diaphragm assembly 100 to pivot the bi-metal lever 74 and thus the valve lever 64 toward its closed position.

In the embodiment of the valve construction 41 illustrated in the drawings, the lower the position of the cam pin 95 relative to the housing 45, the higher the temperature required to seat the valve member 59. Conversely, the higher the position of the cam pin 95 relative to the housing 45, the lower the temperature required to seat the valve member 59 for a purpose hereinafter described.

The cam pin 95 carries a cap 105 at the lower end thereof which projects through the housing 45 to be engaged by a cam surface 106 of a control device 107, the cam surface 106 of the control device 107 controlling the position of the cam pin 95 and thus, the required temperature sensed by the control head 102 to fully seat the valve member 59.

As illustrated in FIGURES 3 and 6, the control device 107 comprises a substantially cup-shaped member having an aperture 108 passing through the closed end thereof and defining an inwardly extending tang 109 which is adapted to be received in a slot 110 formed in a stem 111 whereby rotation of the stem 111 by the interconnected control knob 44 causes like rotation of the control device 107, the control device 107 being rotatably received in a sleeve 112 bolted to the housing 45 at the ears 113 thereof.

An abutment 114 extends outwardly from the camming surface 106 of the control device 107 for a purpose hereinafter described.

The cock valve member 55 has a bifurcated hollow projection 115 extending from the flat end 116 thereof the hollow projection 115 being adapted to receive the reduced end 117 of the stem 111 whereby the stem 111 can be rotated independently of the valve member 55.

A bearing plate 118 has an aperture 119 passing therethrough whereby the bearing plate 118 can telescopically receive the projection 115 of the valve member 55 and be disposed against the housing boss 48, the bearing plate 118 having an outwardly extending camming surface 120 and an outwardly extending stop tang 121 for a purpose hereinafter described. The bearing plate 118 is held from rotational movement by the housing 45 whereby the valve member 55 is rotatable relative to the bearing plate 118.

A clutch plate 122 has an aperture 123 passing therethrough and defining inwardly extending tangs or tabs 124 which are respectively received in the slots 125 formed in the projection 115 of the valve member 55 whereby the clutch plate 122 is drivingly connected to the valve member 55.

The clutch plate 122 has a pair of diametrically disposed bosses 126 formed on one surface thereof whereby the bosses 126 bear against the bearing plate 118 and permit the clutch plate 122 to be rockable relative to the valve member 55 in a manner hereinafter described.

Three tangs 127, 128 and 129 extend outwardly from the clutch plate 122 and are utilized for a purpose hereinafter described, the tang 127 of the clutch plate 122 normally being disposed against the camming surface 120 of the bearing plate 118 whereby the clutch plate 122 is held in one rocked position relative to the valve member 55 so that the tang 127 extends forwardly for a purpose hereinafter described and is engaged by the abutment 114 of the control device 107.

A washer 130 is disposed over the reduced end 117 of the stem 111 whereby a compression spring 131 disposed between the washer 130 and the clutch plate 122 stacks the clutch plate 122 and bearing plate 118 against the housing 45 as illustrated in FIGURE 3, another compression spring 132 being disposed between the end wall of the control device 107 and the washer 130 to hold the camming surface 106 of the control device 107 against sleeve 112.

The camming surface 106 of the control device 107 is shaped in the manner illustrated in FIGURE 7 wherein the camming surface 106 has a substantially non-eccentric portion thereof extending clockwise from the abutment 114 to a point 133 whereby the camming surface 106 rises to an intermediate point 134. Thereafter, the camming surface 106 rises to a high point 135, the high point 135 being interconnected to the abutment 114 by a gradually decreasing sloping surface for a purpose hereinafter described.

The operation of the fuel control system 40 will now be described.

When the control knob 44 is disposed in the "off" position thereof, as illustrated in FIGURE 7, the valve member 55 completely prevents communication between the passages 49 and 53 whereby no fuel can flow to the burner 42 even though the valve member 59 is disposed in its opened position because the cam pin 95 is disposed in a position requiring a temperature of approximately 400° at the sensing head 102 to close the valve member 59 against the valve seat 54.

When the control knob 44 is disposed in the "off" position, the tang 127 of the clutch plate 122 is disposed on the camming surface 120 of the bearing plate 118 whereby the clutch plate 122 is rocked to such a position relative to the valve member 55 that the abutment 114 of the control device 107 is received between the tangs 127 and 128 of the clutch plate 122 and readily engages the tang 127 thereof.

Rotation of the control knob 44 in a clockwise direction from the "off" position thereof is prevented by the abutment 114 engaging the tang 121 of the non-rotatable bearing plate 118.

When it is desired to light the burner 42, the control knob 44 is rotated from the "off" position illustrated in FIGURE 7 to the "light" position illustrated in FIGURE 8 whereby counterclockwise rotation of the control device 107, through the abutment 114 thereof, causes like counterclockwise rotation of the clutch plate 122 and, thus, rotation of the valve member 55 whereby the passage 56 of the valve member 55 interconnects the passages 49 and 53 together to permit fuel to flow from the source thereof into the chamber 47, the valve member 59 being disposed in an opened position because the camming surface 106 of the control device 107 requires the sensing head 102 to sense a temperature of at least 400° F. before the valve member 59 will be closed.

When the control knob 44 is rotated to the "light" position thereof, automatic pilot means ignites the fuel issuing from the burner 42 to cause the flames 43 to exist.

Further counterclockwise rotation of the control knob 44 from the "light" position thereof to the position illustrated in FIGURE 9 causes the valve member 55 to fully open communication between the passages 49 and 53 whereby relatively large flames 43 appear at the burner 42. Simultaneously, the tang 127 of the clutch plate 122 has passed beyond the outwardly extending camming surface 120 of the bearing plate 118 whereby the spring 131 causes the clutch plate 122 to rock on the bosses 126 thereof relative to the valve member 55 and move the tang 127 rearwardly out of engagement with the abutment 114 of the control device 107.

In this manner, the control knob 44 can be further rotated in a counterclockwise direction to any desired temperature setting of the control knob 44 without causing further rotation of the valve member 55 until the control knob 44 is rotated to the flame adjusting region thereof in a manner hereinafter described.

Figure 10:
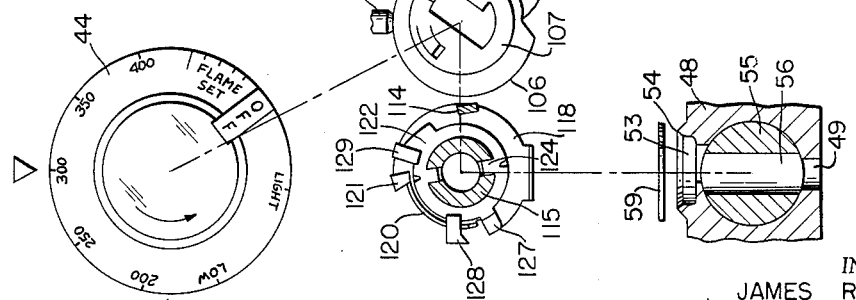

For example, the control knob 44 can be rotated counterclockwise from the position illustrated in FIGURE 9 to a desired temperature setting position, such as 300° F. as illustrated in FIGURE 10, whereby the abutment 114 of the control device 107 passes over and beyond the tang 127 of the clutch plate 122 to the position illustrated in FIGURE 10.

As the control knob 44 is rotated to a desired temperature setting thereof, the camming surface 106 of the control device 107 controls the position of the cam pin 95 whereby the position of the bi-metal lever 74 relative to the abutment 104 of the diaphragm assembly 100 is adjusted so that the sensing head 102 will close the valve member 59 against the valve seat 54 when the cooking utensil sitting on the burner 42 reaches the temperature selected by the control knob 44.

For example, when the control knob 44 is disposed in the position illustrated in FIGURE 10, should the temperature of the cooking utensil sitting on the burner 42 exceed 300° F., the valve member 59 closes against the valve seat 54 terminating communication between the source of fuel and the burner 42 whereby the flames 43 at the burner 42 cease to exist until the temperature of the cooking utensil falls below 300° whereupon the valve member 59 again opens to permit the flames 43 to exist at the burner 42.

In this manner, the valve member 59 cycles between the opened and closed positions thereof to maintain the cooking utensil sitting on the burner 42 at the selected temperature.

However, during the operation of the fuel control system 41 as so far described, the flames 43 appearing at the burner 42 are at their maximum height because the passage 56 of the valve member 55 fully interconnects the passages 49 and 53 together whereby relatively fast cooking is provided by the burner 42.

Figure 11:
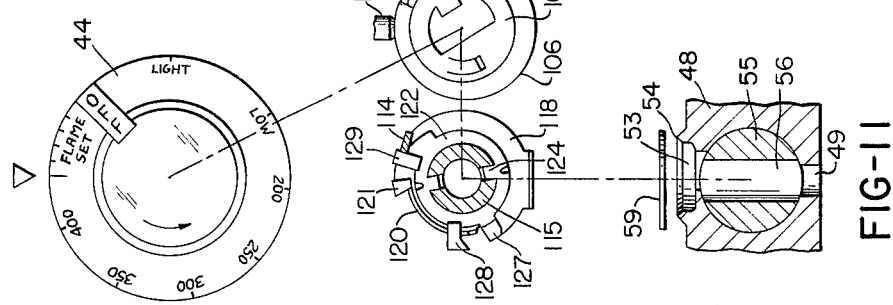

If it is desired to maintain the temperature of the cooking utensil sitting on the burner 42 at a selected temperature, such as 300° F., but have the flames 43 be smaller flames so as to give a more gentle cooking than provided by the larger flames, the control knob 44 is continued to be rotated in a counterclockwise direction until the same reaches the flame set range thereof as illustrated in FIGURE 11.

When the control knob 44 has been rotated to the position illustrated in FIGURE 11, the abutment 114 of the control device 107 has moved against the tang 129 of the clutch plate 122 whereby further counterclockwise rotation of the control knob 44 causes the clutch plate 122 to be rotated in a counterclockwise direction therewith.

Figure 12:
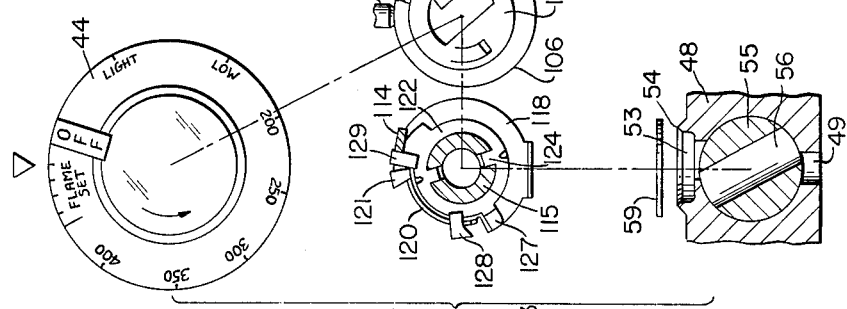

Therefore, as the control knob 44 is rotated from the position illustrated in FIGURE 11 to the position illustrated in FIGURE 12, the valve member 55 is rotated therewith to progressively decrease the amount of fuel flow from the passage 49 to the passage 53 whereby the amount of fuel delivered to the burner 42 is reduced to cause a likewise reduction of the size of the flames 43 at the burner 42.

For example, the control knob 44 can be counterclockwise rotated to the end of the flame set region thereof whereby relatively small flames 43 will be produced at the burner 42 because of the almost closed position of the valve member 55.

After the size of the flame has been selected by the control knob 44, the control knob 44 is rotated in a clockwise direction back to the selected temperature, such as 300° F., as illustrated in FIGURE 13, whereby the burner 42 will be operated in the above manner to maintain the cooking utensil at 300° F. while relatively small flames 43 are being produced by the burner 42.

When it is desired to turn off the burner 42, the control knob 44 is rotated in a clockwise direction from the position illustrated in FIGURE 13 to the "off" position thereof. As the control knob 44 is being rotated to the "off" position thereof, the abutment 114 of the control device 107 eventually engages the tang 128 of the clutch plate 122 to rotate the clutch plate 122 and, thus, the valve member 55 in a clockwise direction until the control knob 44 is disposed in the "off" position and the valve member 55 is disposed in the position illustrated in FIGURE 7, the tang 127 of the clutch plate 122, when being returned to the "off" position, riding out over the camming surface 120 of the bearing plate 118 to reposition the clutch plate 122 in the position illustrated in FIGURE 7 so that the tang 127 can be again engaged by the abutment 114 of the control device 107 to cause operation of the clutch plate 122 in the manner previously described when the control knob 44 is again turned to an "on" position thereof.

Therefore, it can be seen that not only does the valve construction 41 of this invention permit a burner of a gas range or the like to maintain the temperature of a cooking utensil at a selected temperature, but also the valve construction 41 of this invention permits the operator to select the flame height of the burner 42 in a relatively simple manner by utilizing a single control knob.

While the valve member 55 has been illustrated as beginning with a full "on" position thereof and then utilizing the flame control section of the flame control knob 44 to reduce the flame size at the burner 42, it is to be understood that the valve member 55 can be so constructed that the same would operate in a converse manner.

For example, reference is made to FIGURES 14–17 illustrating another rotatable valve member 55a of this invention, the valve member 55a having a bore 136 formed therein and interconnected to a plurality of bores 137, 138 and 139.

The valve housing boss 48a has the passages 49a and 53a formed therein in the same manner as the passages 49 and 53 previously described except that an additional smaller passage 140 is formed in the boss 48a and interconnects the valve seat 54a with the bore 52a of the housing boss 48a.

The valve member 55a, FIGURES 14–17, is operated in a manner similar to the valve member 55 previously described.

When the control knob of the valve member 55a is disposed in the "off" position thereof, the valve member 55a is disposed in the position illustrated in FIGURE 14 whereby communication between the inlet passage 49a and the valve seat 54a is prevented by the valve member 55a.

When the valve 55a is rotated to the "light" position thereof, the valve member 55a is disposed in the position illustrated in FIGURE 15 whereby fuel from the inlet passage 49a flows to not only the passage 53a but also the passage 140 through the bores 136 and 138 of the valve member 55a.

Thereafter, as the valve member 55a is rotated to the idle position thereof, the inlet passage 49a is only interconnected to the passage 140 by the bores 136 and 138 of the valve member 55a whereby a relatively low flame is produced at the gas burner when the valve member 55a is disposed in the position illustrated in FIGURE 16.

Therefore, as the control knob is moved to a desired temperature setting thereof the flames at the burner are at their low position.

Should it be desired to raise the height of the flame at the burner, the control knob is rotated to the flame control region thereof whereby the valve member 55 is again engaged and rotated in a counterclockwise direction as illustrated in FIGURE 17 to progressively interconnect the bore 139 with the passage 53a to raise the height of the flame to its desired height, FIGURE 17 illustrating the valve member 55a rotated to the fully opened position thereof at the highest setting of the control knob.

Another embodiment of the gas cock of this invention is illustrated in FIGURES 18 and 19 whereby the gas cock 55b has branch passages 141, 142 and 143 formed therein, the housing boss 48a being formed in the same manner as the housing boss 48a of FIGURE 14 whereby like reference numerals are utilized to designate like parts.

When the valve member 55b is disposed in the "off" position thereof, fluid communication between the inlet passage 49a and the valve seat 54a is prevented by the valve member 55b.

When the valve member 55b is rotated in a counterclockwise direction from the "off" position thereof to the "light" position thereof, the passage 141 is in communication with the passage 49a and the passage 142 of the valve member 55b is in communication with the passage 53a to provide a sufficient amount of fuel to flow through the valve seat 54a to the burner.

Further counterclockwise rotation of the valve member 55b causes the passages 142 to only interconnect the inlet passage 49a with the passage 140 so that when the valve member 55b is disengaged from the control knob, the flame at the burner will be at the lowest height thereof so that the control knob can be set at any desired temperature setting because the valve member 55b blocks off passage 53a at this time.

Thereafter, should it be desired to adjust the flame height, the control knob is rotated to the flame set region whereby the control knob reengages with the valve member 55b to rotate the same.

Further movement of the control knob 44 in a counterclockwise direction through the flame control region causes the valve member 55b to be rotated in a counterclockwise direction to progressively increase communication between the passage 143 and the passage 53a to adjust the height of the flame at the burner to the desired height.

Therefore, it can be seen that different gas cock valve members can be utilized with the valve construction 41 of this invention to provide for flame control and selecting a desired temperature of a cooking utensil with a single control knob.

Another embodiment of a valve construction of this invention for performing a function similar to the valve construction 41 of the fuel control system 40 is illustrated in FIGURE 20 and is generally indicated by the reference numeral 144.

The valve construction 144 includes a valve housing 145 having an inwardly directed boss 146 provided with an inlet passage 147 intersecting a tapering bore 148 receiving a rotatable gas cock 149, the gas cock 149 having a transverse bore 150 passing therethrough and being adapted to interconnect the inlet passage 147 with the passage 151 formed in the boss 146 and leading to an annular valve seat 152. The annular value seat 152 is controlled by a valve member 153 in a manner similar to the valve member 59 previously described.

As illustrated in FIGURES 20 and 21, the valve member 149 has a pair of diammetrically opposed slots 154 formed on the outer free end thereof and adapted to receive inwardly directed tangs 155 of a clutch plate member 156 whereby the tangs 155 of the clutch plate 156 interconnect the clutch plate 156 with the valve member 149 and permit the clutch plate 156 to be rockable relative to the valve member 149 for a purpose hereinafter described.

The valve member 149 has a pin means 157 extending outwardly from the free end 158 thereof for a purpose hereinafter described.

The clutch plate 156 has an outwardly extending tang 159 formed thereon and adapted to engage a camming surface 160, FIGURE 20, of the valve housing 145, the camming surface 160 tapering off to a reduced portion 161 as illustrated in FIGURES 22–29 for a purpose hereinafter described.

A control device 162 is formed in a manner substantially similar to the control device 107 previously described, the control device 162 having a camming surface 163 for controlling the temperature setting of the valve member 153 in the manner previously described.

The control device 162 has an abutment 164 extending therefrom which is engageable with the tang 159 of the clutch plate 156 as long as the tang 159 is disposed on the camming surface 160 of the housing 145.

An aperture 165 passes through the closed end of the cup-shaped control device 162 and defines a pair of inwardly extending tangs 166 thereof which are adapted to be respectively received in opposed slots 167 formed in a stem 168 whereby rotation of the stem 168 causes like rotation of the control device 162, the stem 168 being interconnected to a suitable control knob 169, FIGURE 22.

The stem 168 has an outwardly extending projection 170 formed on the end thereof and is adapted to bear against the end 158 of the valve member 149 and be rotatable relative thereto, the stem 170 receiving a washer 171, a sector plate 172 and a retaining member 173 in stacked relation between the stem 168 and the end 158 of the valve member 149, the sector plate 172 being non-rotatable relative to the stem 168.

A compression spring 174 is disposed between the camming structure 163 of the control device 162 and the flange or tang 159 of the clutch plate 156 to hold the tang against the housing 145 for a purpose hereinafter described.

Similarly, another compression spring 175 is disposed between the closed end of the control device 162 and the washer 171 to hold the valve member 149 in sealing relation in the bore 148 of the housing 145 as well as to hold the camming surface 163 of the control device 162 against the sleeve 176 suitably secured to the housing 145 in the manner previously described.

The operation of the valve structure 145 will now be described and reference is made to FIGURES 22–29.

When the control knob 169 is disposed in the "off" position thereof, the valve member 149 prevents communication between the passages 147 and 151 as illustrated in FIGURE 22 whereby the tang 159 of the clutch plate 156 is disposed against the camming surface 160 of the valve housing 145 and, thus, held forwardly to be engaged by the abutment 164 of the control device 162.

Counterclockwise rotation of the control knob 169 from the "off" position thereof to the "light" position thereof causes the abutment 164 of the control device 162 to engage the tang 159 of the clutch plate 156 and rotate the clutch plate 156 in a counterclockwise direction whereby the valve member 149 is rotated therewith to interconnect the passage 147 with the passage 151 so that the burner can be ignited by the automatic pilot means.

Further counterclockwise rotation of the control knob 169 from "light" position illustrated in FIGURE 23 to the position illustrated in FIGURE 24 causes the abutment 164 of the control device 162 to move the tang 159 of the clutch plate 156 into the slot 161 of the valve housing 145 whereby the spring 174 causes the clutch plate 156 to rock relative to the valve member 149 out of engagement with the abutment 164 of the control device 162. In this manner the control device 162 can be further rotated in a counterclockwise direction to a desired temperature setting without further moving the valve member 149, the valve member 149 thus being disposed in the fully opened position thereof as illustrated in FIGURE 24.

For example, the control knob 169 can be rotated to 300° F., FIGURE 25, whereby the camming surface 163 of the control device 162 sets the temperature at which the valve member 153 will seat against the valve seat 152 in the manner previously described.

Figure 26:
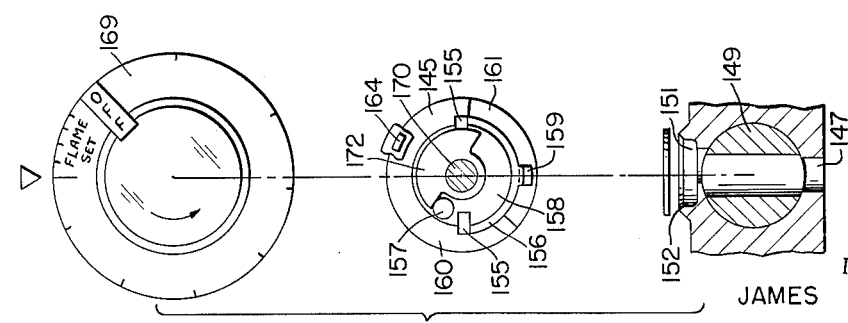

However, should it be determined that the flame height at the burner is too large for the desired cooking flames, the control knob 169 can be rotated to the flame control position illustrated in FIGURE 26 whereby the sector plate 172 engages the pin means 157 of the valve member 149, the sector plate 172 being rotated in unison with the stem 168.

Figure 27:
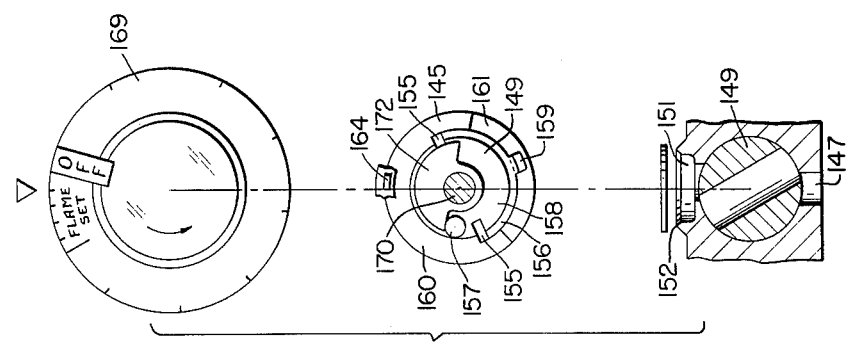

Further counterclockwise rotation of the control knob 169 from the position illustrated in FIGURE 26 to the position illustrated in FIGURE 27 causes the sector plate 172 to cause like rotation of the valve member 149 whereby the valve member 149 progressively closes to lower the size of the flame to the desired height.

Figure 28:
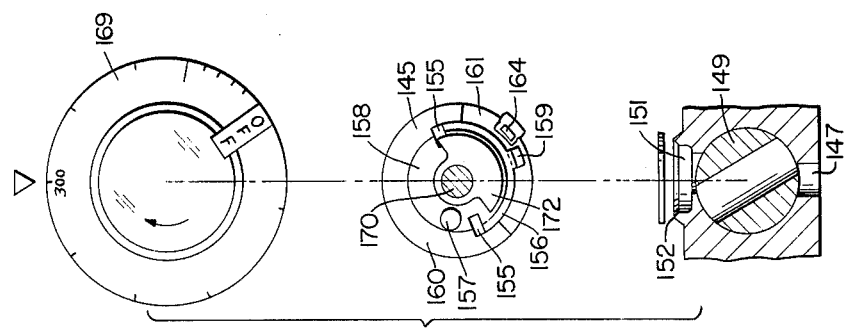

Thereafter, the control knob 169 can be rotated in a clockwise direction back to the selected temperature, such as 300° F. as illustrated in FIGURE 28, whereby the valve member 153 maintains the cooking utensil at the selected temperature even though the flame height has been adjusted to a smaller flame height than that previously described.

Figure 29:
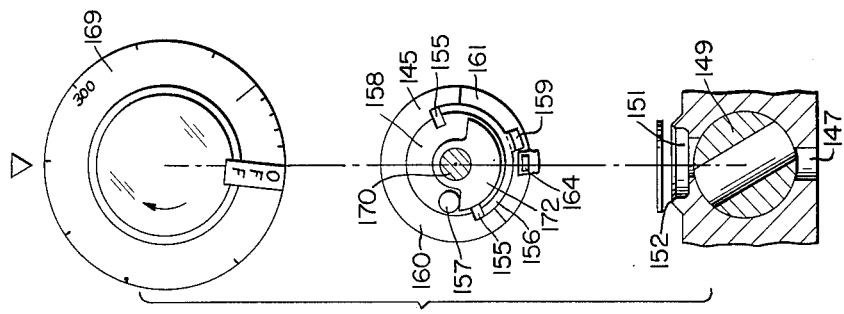

When it is desired to turn off the burner, the control knob 169 is rotated in a clockwise direction from the position illustrated in FIGURE 28 until the sector plate 172 again engages the pin means 157 of the valve member 149 as illustrated in FIGURE 29 to rotate the valve member 149 back to its closed position as illustrated in FIGURE 22. As the valve member 149 is being rotated back to its closed position, the tang 159 of the clutch plate 156 rides up on the camming surface 160 of the housing 145 to be again disposed in a position to be re-engaged by the abutment 164 of the control device 162 in the manner previously described because the clutch plate 156 is rocked forwardly relative to the valve member 149.

Therefore, it can be seen that another valve construction of this invention is provided which is not only adapted to maintain the temperature of the cooking utensil at a selected temperature, but is also adapted to adjust the flame height at the burner in a relatively simple manner by a single control knob.

While the various embodiments of this invention previously described have all been concerned with the problem of maintaining a cooking utensil at a desired temperature while adjusting the flame height at the burner, there are other types of fuel control systems which require a pair of valve members for controlling fluid flow to a burner or the like.

For example, another fuel control system of this invention is generally indicated by the reference numeral 176 in FIGURE 30 and comprises a valve construction 177 for interconnecting a source of fuel at an inlet 178 to a suitable burner (not shown) similar to the burner 42 previously described and interconnected to an outlet coupling 179 by a suitable conduit (not shown).

In particular, the valve construction 177 comprises valve housing members 180, 181 and 182 suitably interconnected together, the valve housing 181 having the inlet 178 formed therein and terminating at a flat surface 183 of the valve housing member 181.

Another passage 184 is formed in the housing member 181 and interconnects the surface 183 thereof with the other surface 185 thereof for a purpose hereinafter described, the surface 185 cooperating with the housing member 182 to define a chamber 186 leading to the outlet coupling 179.

A rotatable valve member 187 is disposed in the chamber 188 defined between the housing members 180 and 181, the rotatable valve member 187 having a flat surface 189 disposed flush against the flat surface 183 of the housing member 181.

An arcuate groove 190 is formed in the surface 189 of the rotatable valve member 187 and is adapted to interconnect the passages 178 and 184 in the housing member 181 when the valve member 187 is rotated to align the groove 190 thereof with the passages 178 and 184 in a manner well known in the art.

The rotatable valve member 187 and housing 181 have aligned bores 191 and 192 formed therethrough to receive a shaft 193 carrying a valve member 194 on the other end thereof and pressed against the surface 185 of the housing member 181 by a compression spring 195, the valve member 194 controlling communication between the outlet passage 184 and the chamber 186 of the valve construction 177 for a purpose hereinafter described.

The shaft 193 is interconnected to a retainer 196 which is threaded into a rotatable control device 197, the rotatable control device 197 being interconnected to a semi-circular flange 200 of a shaft member 198 having a control knob 199 interconnected to the free end thereof.

The control device 197 has a plurality of tangs 201, 202 and 203 respectively extending outwardly therefrom, the tang 201 normally being received in a slot 204 formed in the housing member 180 to prevent rotation of the control device 197 until the tang 201 is released from the slot 204 by the operator pushing inwardly on the control knob 199 in opposition to the force of a compression spring 205.

The control device 197 has a pair of slots 206 and 207 formed therein adapted to respectively register with an outwardly extending tang 208 formed on a clutch plate 209, the clutch plate 209 having a plurality of tangs 210, 211 and 212 extending therefrom.

The clutch plate 209 has an aperture 213 passing therethrough which is adapted to respectively receive a threaded projection 214 of the control device 197 in the manner illustrated in FIGURE 30 whereby the compression spring 205 compacts the clutch plate 209 against the control device 197 and the valve member 187 in sealing relation with the housing member 181.

The tang 211 of the clutch plate 209 is disposed in a slot 215 formed in the rotatable valve member 187 whereby the clutch plate 209 is disposed in driving relation with the rotatable valve member 187.

The operation of the valve construction 177 will now be described.

When the valve construction 177 is disposed in the "off" position thereof as illustrated in FIGURE 32, the tang 212 of the clutch plate 209 is disposed against a stop abutment 216 of the housing member 180 whereby clockwise rotation of the control knob 199 is prevented.

Also, the tang 208 of the clutch plate 209 is disposed in the slot 207 of the control device 197 whereby counterclockwise rotation of the control knob 199 causes like rotation of the clutch plate 209 because the spring 205 maintains the tang 208 of the clutch plate 209 in the slot 207 of the control device 197.

When it is desired to light the burner interconnected to the valve construction 177, the control knob 199 is rotated to the "light" position thereof as illustrated in FIGURE 34 whereby the control device 197 and clutch plate 209 are rotated in unison causing like rotation of the valve member 187 to cause the slot 190 thereof to fully interconnect the inlet passage 178 with the outlet passage 184 so that fuel can flow from the inlet passage 178 to the outlet 179 leading to the burner, the valve member 194 also being rotated with the control knob 189 and being so constructed and arranged that the same progressively closes the outlet passage 184 as the control knob 199 is further rotated in a counterclockwise direction for a purpose hereinafter described.

When the control knob 199 is disposed in the "light" position thereof, the tang 210 of the clutch plate 209 is brought into engagement with a stop abutment 217 of the housing member 180 whereby further counterclockwise rotation of the clutch plate 209 is prevented by the stop abutment 217.

After the burner has been lit in the above manner by any suitable pilot means or the like, the control knob 199 is rotated to the flame control region of the control knob 199 in the manner illustrated in FIGURE 34 whereby such counterclockwise rotation of the control device 197 causes the clutch plate 209 to be pushed rearwardly in opposition to the force of the compression spring 205 to permit the tang 208 of the clutch plate 209 to clear the slot 207 because the clutch plate 209 is prevented from further rotation by the stop means 217 of the housing member 180.

As the control knob 189 is rotated to the flame control position as illustrated in FIGURE 34, the slot 206 of the control device 197 is brought into registry with the tang 208 of the clutch plate 209 whereby the spring 205 forces the tang 208 momentarily into the slot 206 whereby a click is heard by the operator of the fuel control system 176 to indicate that the control knob 189 is now disposed in the flame control region thereof.

Further counterclockwise rotation of the control knob 199 from the position illustrated in FIGURE 34 to any position in the flame control region of the control knob 199, FIGURE 35, causes the tang 208 of the clutch plate 209 to be forced out of the slot 206 by causing the clutch plate 209 to rock backwardly relative to the valve member 187 in opposition to the force of the compression spring 205 to permit the control device 197 to be rotated in a counterclockwise direction.

As the control knob 199 is rotated in a counterclockwise direction to any desired position in the flame control region thereof, the valve member 194 is also rotated therewith whereby the size of the flame of the burner can be adjusted because counterclockwise rotation of the control knob 199 causes the valve 194 to progressively close the outlet passage 184 to impede the flow of fuel to the burner.

Therefore, it can be seen that the valve member 187 is first fully opened upon initial counterclockwise movement of the control knob 199 whereby further movement of the valve member 187 is interrupted although the control knob 199 is continued to be moved to adjust the position of the valve member 194 to provide the desired flame setting at the burner.

When it is desired to turn off the burner by the valve construction 177, the control knob 199 is rotated in a clockwise direction until the slot 206 of the control device 197 is disposed in registry with the tang 208 of the clutch plate 209 whereby the spring 205 forces the tang 208 of the clutch plate 209 into the slot 206 of the control device 197 to cause the clutch plate 209 to rotate in unison with the control device 107 as illustrated in FIGURE 36.

Thus, the valve member 187 is rotated in a clockwise direction in unison with the control knob 199 to progressively close communication between the inlet passage 178 and the outlet passage 184.

When the clutch plate 209 is being rotated in a clockwise direction by the control knob 199 to the position illustrated in FIGURE 37 whereby the tang 212 of the clutch plate 209 hits the stop abutment means 216 of the housing member 180, further rotation of the clutch plate 209 is prevented. However, the control device 197 can be further rotated in a clockwise direction to cause the tang 208 of the clutch plate 209 to click into the slot 206 thereof so that control knob 199 will again be disposed in the "off" position illustrated in FIGURE 32.

If desired, one of the slots 206 and 207 of the control device 197 can be eliminated. However, no clicking sound would be produced to indicate to the operator the various positions of the control knob 199.

Therefore, it can be seen that another fuel control system and valve construction of this invention are provided in FIGURES 30–37 wherein a first valve member is moved to a predetermined position by a control device and thereafter disengaged from the control device so that the control device can further control a second valve member independently of the first valve member.

While the form of the invention now preferred has been disclosed as required by the statutes, other forms may be used, all coming within the scope of the claims which follow.

What is claimed is:
1. In combination, means for interconnecting a source of fuel to a burner or the like, a first valve member controlling the flow of fuel through said means, a second valve member controlling the flow of fuel through said means at a point downstream from said first valve member, a control device having a rotatable range of movement from an off position without axial movement of said control device during said range of movement thereof, said range of movement having a first section following said off position in one direction and a second section following said first section in said one direction, means operatively interconnecting said control device to said second valve member to cause said control device to control the position of said second valve member throughout substantially the entire range of movement of said control device in said one direction, and means operatively interconnecting said control device to said first valve member only at said first section of said range of movement of said control device, said control device opening said first valve member as said control device is moved from said off position to said second section in said one direction and closing said first valve member as said control device is moved from said second section to said off position in the opposite direction.

2. In combination, means for interconnecting a source of fuel to a burner or the like, a valve member controlling the flow of fuel through said means, a control device having a rotatable range of movement from an off position without axial movement of said control device during said range of movement thereof, said range of movement having a light section following said off position in one direction, a temperature section following said light section in said one direction and a flame control section following said temperature section in said one direction, and means operatively interconnecting said control device to said valve member only at said light section and said flame control section of said range of movement of said control device, said control device opening said first valve member as said control device is moved from said off position to said temperature section in said one direction and closing said first valve member as said control device is moved from said temperature section to said off position in the opposite direction, said control device progressively closing said first valve member as said control device is moved from said temperature section toward the end of said flame control section in said one direction and said control device not affecting the position of said valve member as said control device is moved from said end of said flame control section toward said temperature section in said opposite direction.

3. In combination, means for interconnecting a source of fuel to a burner or the like, a first valve member controlling the flow of fuel through said means, a second valve member controlling the flow of fuel through said means at a point downstream from said first valve member, means responsive to the temperature produced by said burner to control said second valve member, a control device having a rotatable range of movement beginning at an off position without axial movement of said control device during said range of movement thereof, said range of movement having a light section following said off position in one direction, a temperature section following said light section in said one direction and a flame control section following said temperature section in said one direction, means operatively interconnecting said control device to said second valve member to select the temperature that closes said second valve member, and means operatively interconnecting said control device to said first valve member only during said light section and said flame control section of said range of movement of said control device, said control device fully opening said first valve member when said control device is moved from said off position to said temperature section in said one direction and fully closing said first valve member when said control device is moved from said temperature section to said off position in the opposite direction, said control device progressively closing said first valve member as said control device is moved from said temperature section toward the end of said flame control section in said one direction and said control device not affecting the position of said first valve member as said control device is moved from said end of said flame control section toward said temperature section in said opposite direction.

4. In combination, a housing having a passage formed therein, a valve member carried by said housing and controlling fluid flow through said passage, a control device carried by said housing and having a rotatable range of movement from an off position thereof in one direction without axial movement of said control device during said range of movement thereof, and means operatively interconnecting said control device to said valve member only at the end portions of said range of movement of said control device in said one direction whereby said control device only controls said valve member at the end portions of said range of movement in said one direction.

5. In combination, a housing having a passage formed therein, a first valve member carried by said housing and controlling fluid flow through said passage, a second valve member carried by said housing and controlling fluid flow through said passage at a point downstream from said first valve member, a control device carried by said housing and having a rotatable range of movement from an off position thereof in one direction without axial movement of said control device during said range of movement thereof, means operatively interconnecting said control device to said second valve member to cause said control device to control said second valve member throughout substantially the entire range of movement of said control device in said one direction, and means operatively interconnecting said control device to said first valve member only at the beginning end portion of said range of movement of said control device in said one direction whereby said control device only controls said first valve member at the beginning end portion of said range of movement in said one direction.

6. In combination, a housing having a passage formed therein, a first valve member carried by said housing and controlling fluid flow through said passage, a second valve member carried by said housing and controlling fluid flow through said passage at a point downstream from said first valve member, a control device carried by said housing and having a rotatable range of movement from an off position thereof in one direction without axial movement of said control device during said range of movement thereof, means operatively interconnecting said second valve member to said control device to cause said control device to control said second valve member throughout substantially the entire range of movement of said control device in said one direction, and means operatively interconnecting said first valve member to said control device only at the end portions of the range of movement of said control device in said one direction whereby said control device only controls said first valve member at the end portions of said range of movement in said one direction.

7. In combination, a housing having an inlet and an outlet and having passage means interconnecting said inlet with said outlet, a first valve member carried by said housing and controlling fluid flow through said passage means, a second valve member carried by said housing and controlling fluid flow through said passage means at a point downstream from said first valve member, a control device carried by said housing and having a rotatable range of movement beginning at an off position without axial movement of said control device during said range of movement thereof, said range of movement having a first section following said off position in one direction, an intermediate section following said first section in said one direction, and a terminal section following said intermediate section in said one direction, means operatively interconnecting said second valve member to said control device to cause said control device to control said second valve member throughout substantially the entire range of movement of said control device in said one direction, and means operatively interconnecting said first valve member to said control device only at said first section and said terminal section of said range of movement of said control device in said one direction.

8. In combination, a housing, a rotatable member carried by said housing, a clutch plate interconnected to said member and rockable relative thereto, means normally maintaining said clutch plate in one position relative to said member, and a control device carried by said housing and normally in driving relation with said clutch plate, said control device having a range of movement from an off position in one direction, and means for rocking said clutch plate out of driving relation with said control device after said control device has been first moved a selected distance in said one direction from said off position whereby said member moves with said control device only when said clutch plate is in driving relation with said control device so that said control device can be further moved in said one direction independently of said member.

9. In combination, a housing having an inlet and an outlet, a rotatable valve member carried by said housing and controlling fluid flow between said inlet and said outlet, a bearing plate disposed against said valve member and having a cam surface, a clutch plate interconnected to said valve member and rockably mounted against said bearing plate, said clutch plate having three tangs extending therefrom, one of said tangs normally being disposed against said cam surface whereby said clutch plate is held in one position relative to said valve member, a control device carried by said housing and having a rotatable range of movement, said control device having an abutment normally disposed between said one tang of said clutch plate and a tang adjacent thereto, and spring means disposed between said clutch plate and said control device to hold said clutch plate against said bearing plate, said control device when rotated in one direction first rotating said valve member as said abutment pushes against said one tang until said one tang passes said cam surface and said spring means rocks said clutch plate relative to said valve member to move said one tang out of engagement with said abutment whereby rotation of said valve member stops although said control device is further rotated in said one direction until the abutment engages the remaining tang of said clutch member to cause further rotation of said valve member.

10. A combination as set forth in claim 9 wherein another movable member is carried by said housing and is operatively interconnected to said control device whereby said control device controls said other movable member throughout substantially the entire range of movement of said control device.

11. A combination as set forth in claim 9 wherein another valve member is carried by said housing and controls fluid flow between said inlet and said outlet at a point downstream from said first-named valve member, said second-named valve member being operatively interconnected to said control device whereby said control device controls said second-named valve member throughout substantially the entire range of movement of said control device.

12. In combination, a housing, a rotatable member carried by said housing, a bearing plate disposed against said valve member and having a cam surface, a clutch plate interconnected to said member and rockably mounted against said bearing plate, said clutch plate having three tangs extending therefrom, one of said tangs normally being disposed against said cam surface whereby said clutch plate is held in position relative to said member, a control device carried by said housing and having a range of movement, said control device having an abutment normally disposed between said one tang of said clutch plate and a tang adjacent thereto, said abutment being engageable with all of said tangs, and spring means disposed between said clutch plate and said control device to hold said clutch plate against said bearing plate.

13. In combination, a housing having an inlet and an outlet and having an abutment, a rotatable valve member carried by said housing and controlling fluid flow between said inlet and said outlet, a control device carried by said housing and having a rotatable range of movement, said control device having an indentation formed therein, a clutch plate interconnected to said valve member and rockable relative thereto, said clutch plate having a pair of tangs extending therefrom with one of said tangs normally disposed in said indentation of said control device, and spring means disposed between said valve member and said clutch plate to tend to hold said clutch plate against said control device, said control device when rotated in one direction first causing rotation of said valve member as said control device pushes against said one tang until the other tang of said clutch plate engages said abutment to stop further rotation of said clutch plate and said valve member although said control device is further rotated in said one direction by causing said clutch plate to rock relative to said valve member and move said one tang thereof out of said indentation of said control device.

14. In combination, a housing having an inlet and an outlet and having an abutment, a rotatable valve member carried by said housing and controlling fluid flow between said inlet and said outlet, a control device carried by said housing and having a rotatable range of movement, said control device having a pair of indentations formed therein, a clutch plate interconnected to said valve member and rockable relative thereto, said clutch plate having a pair of tangs extending therefrom with one of said tangs normally disposed in one of said indenations of said control device, and spring means disposed between said valve member and said clutch plate to tend to hold said clutch plate against said control device, said control device when rotated in one direction first causing rotation of said valve member as said control device pushes against said one tang until the other tang of said clutch plate engages said abutment to stop further rotation of said clutch plate and said valve member although said control device is further rotated in said one direction by causing said clutch plate to rock relative to said valve member and move said one tang thereof out of said one indentation of said control device into the other indentation and back out of the other indentation.

15. A combination as set forth in claim 14 wherein another movable member is carried by said housing and is operatively interconnected to said control device whereby said control device controls said other movable member throughout substantially the entire range of movement of said control device.

16. A combination as set forth in claim 14 wherein another valve member is carried by said housing and controls fluid flow between said inlet and said outlet at a point downstream from said first-named valve member, said second-named valve member being operatively interconnected to said control device whereby said control device controls said second-named valve member throughout substantially the entire range of movement of said control device.

17. In combination, a housing having an abutment, a rotatable member carried by said housing, a control device carried by said housing and having a range of movement, said control device having an indentation formed therein, a clutch plate interconnected to said member and rockable relative thereto, said clutch plate having a pair of tangs extending therefrom with one of said tangs normally disposed in said indentation of said control device and the other tang engageable with said abutment, and spring means disposed between said member and said clutch plate to tend to hold said clutch plate against said control device.

18. In combination, a housing having an inlet and an outlet and having a cam surface, a rotatable valve member carried by said housing and controlling fluid flow between said inlet and said outlet, said valve member carrying a pin means, a clutch plate interconnected to said valve member and rockable relative thereto, said clutch plate having a tang extending therefrom and normally disposed against said cam surface to hold said clutch plate in one position relative to said valve member, a control device carried by said housing and having a rotatable range of movement, said control device having an abutment normally disposed against said tang of said clutch plate and having a sector plate engageable with said pin means of said valve member, and spring means disposed between said control device and said clutch plate to hold said clutch plate against said housing, said control device when rotated in one direction first rotating said valve member as said abutment pushes against said tang until said tang passes said cam surface and said spring means rocks said clutch plate relative to said valve member to move said tang out of engagement with said abutment whereby rotation of said valve member stops although said control device is further rotated in said one direction until said sector plate engages said pin means to cause further rotation of said valve member.

19. A combination as set forth in claim 18 wherein another movable member is carried by said housing and is operatively interconnected to said control device whereby said control device controls said other member throughout substantially the entire range of movement of said control device.

20. A combination as set forth in claim 18 wherein another valve member is carried by said housing and controls fluid flow between said inlet and said outlet at a point downstream from said first-named valve member, said second-named valve member being operatively interconnected to said control device whereby said control device controls said second-named valve member throughout substantially the entire range of movement of said control device.

21. In combination, a housing having a cam surface, a rotatable member carried by said housing and having a pin means extending therefrom, a clutch plate interconnected to said member and rockable relative thereto, said clutch plate having a tang extending therefrom and normally disposed against said cam surface to hold said clutch plate in one position relative to said member, a control device carried by said housing and having a range of movement, said control device having an abutment normally disposed against said tang of said clutch plate as long as said tang is against said cam surface, said control device having a sector plate engageable with said pin means of said member, and spring means disposed between said control device and said clutch plate to hold said clutch plate against said housing.

References Cited by the Examiner
UNITED STATES PATENTS

| | | | |
|---|---|---|---|
| 1,972,163 | 9/1934 | Pearson | 74—125.5 |
| 2,213,956 | 9/1940 | Drake | 236—68 |
| 2,963,042 | 12/1960 | Dolby et al. | 137—614.11 |
| 2,990,119 | 6/1961 | Willson | 236—99 |

(Other references on following page)

UNITED STATES PATENTS

| | | | |
|---|---|---|---|
| 3,011,720 | 12/1961 | Ives | 236—99 |
| 3,011,721 | 12/1961 | Wiltz | 236—99 |
| 3,030,025 | 4/1962 | Huff | 236—99 |
| 3,030,026 | 4/1962 | Wiberg | 236—99 |
| 3,062,449 | 11/1962 | Wantz et al. | 236—99 |
| 3,073,526 | 1/1963 | Lamar | 236—99 |
| 3,092,142 | 6/1963 | Willson | 137—614.11 |

OTHER REFERENCES

Publication: The Inventors Universal Educator, published by F. G. Dieterich, Washington, D.C., 1931 ed. (Pages 32 and 37 relied on.)

EDWARD J. MICHAEL, *Primary Examiner.*

FREDERICK L. MATTESON, Jr., *Examiner.*